Feb. 15, 1966  J. ALLING ETAL  3,235,176
CARD PUNCHING MACHINE
Filed Oct. 30, 1963  4 Sheets-Sheet 1
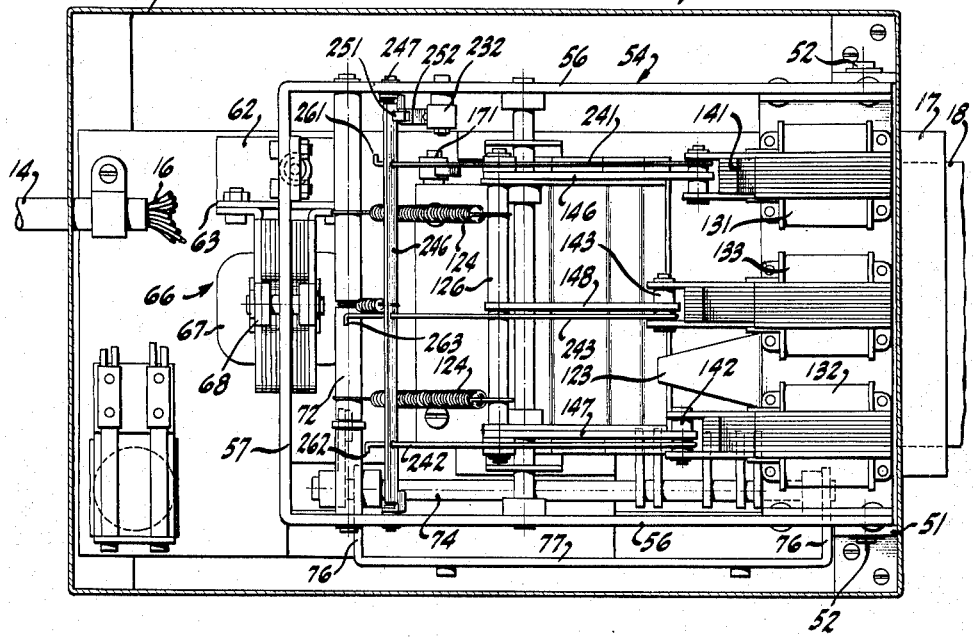
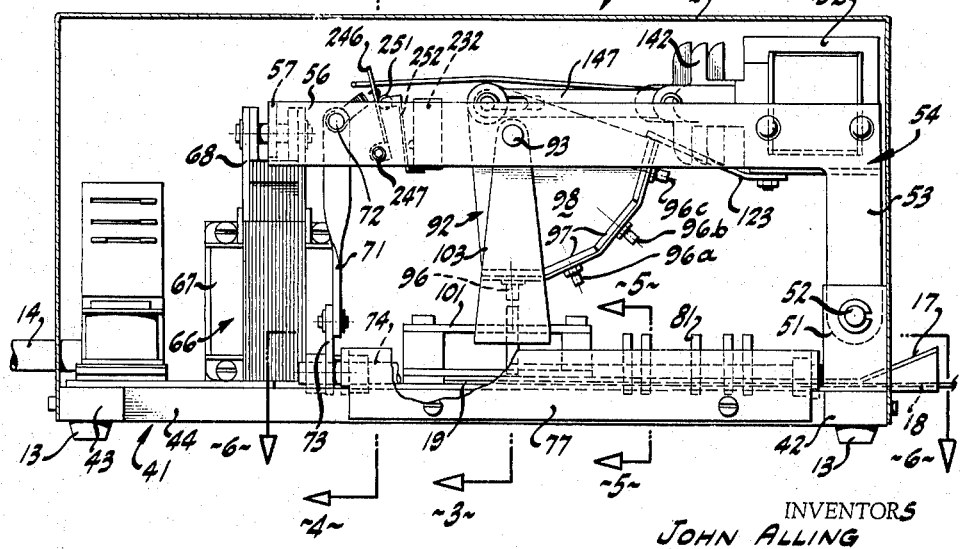
INVENTORS
JOHN ALLING
RICHARD D. MUNSON
FRANK J. GUARNERA
BY Lothrop & West
ATTORNEYS

INVENTORS
JOHN ALLING
RICHARD D. MUNSON
FRANK J. GUARNERA

BY Lothrop & West
ATTORNEYS

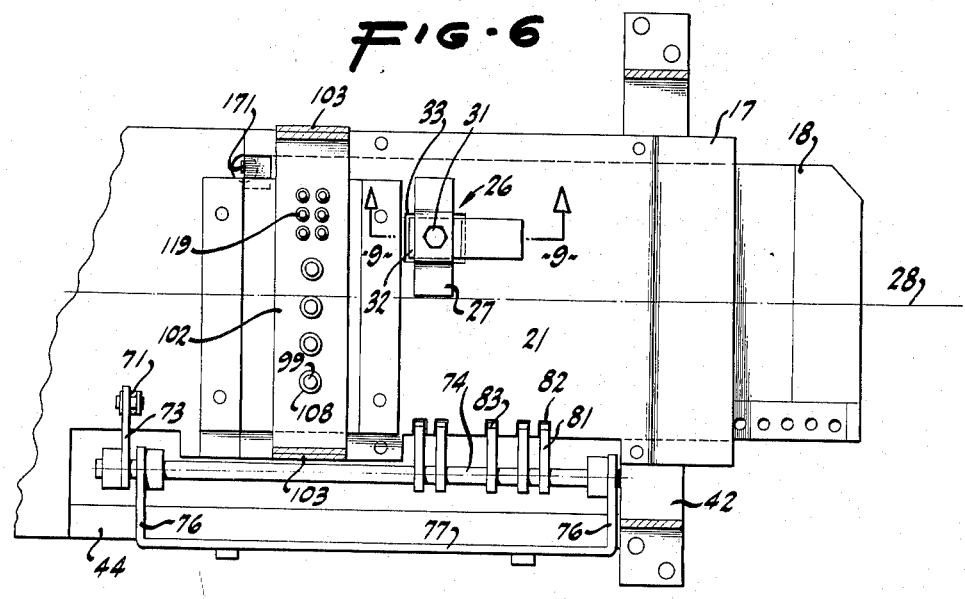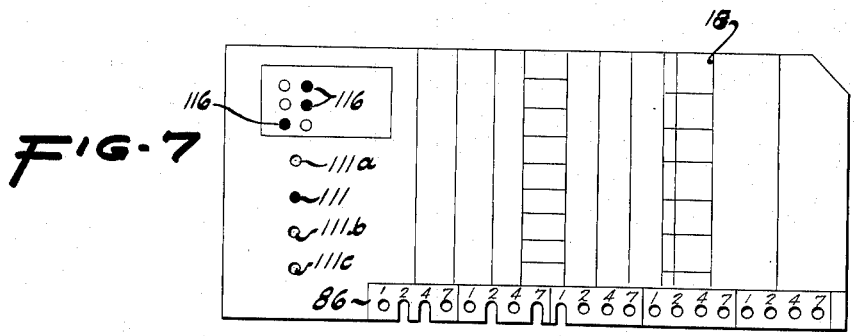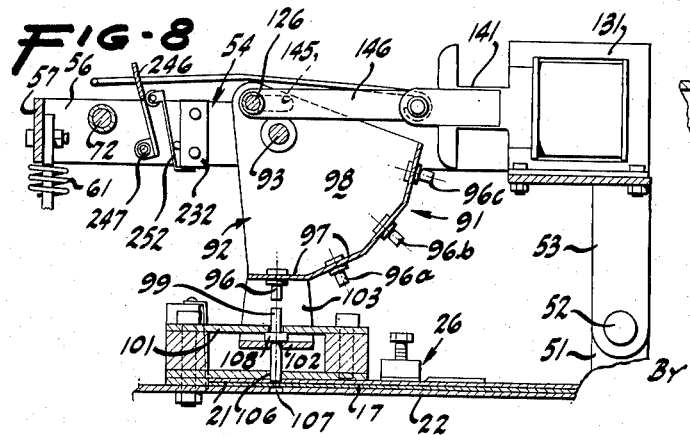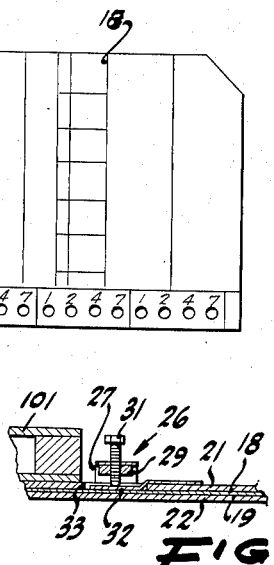

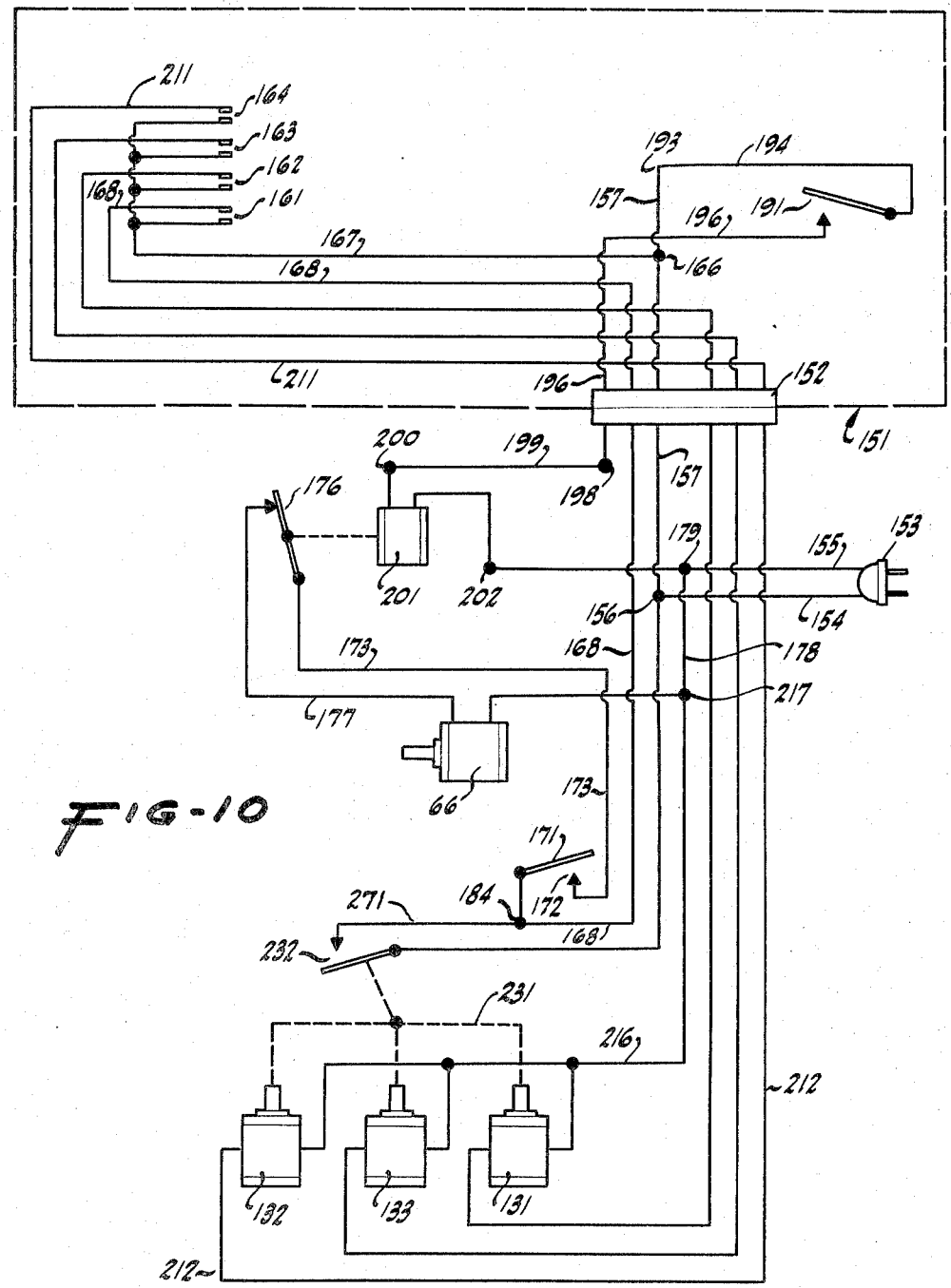

United States Patent Office 3,235,176
Patented Feb. 15, 1966

3,235,176
CARD PUNCHING MACHINE
John Alling, 1819 J St., Sacramento, Calif.; Richard D. Munson, 731 Claridge Drive, Pacifica, Calif.; and Frank J. Guarnera, 1840 Radcliffe Drive, Reno, Nev.
Filed Oct. 30, 1963, Ser. No. 320,171
6 Claims. (Cl. 234—42)

The invention relates to machines for recording information on cards by punching the cards in a selective manner and, more particularly to card punching machines which are triggered by electrical impulses received from a primary source removed from the card punching machine itself.

Many card punching machines have put in their appearance, both in the market place and in the patent literature. In the main, these prior devices have served their purposes in a satisfactory manner. So far as is known, however, the prior art machines have not been particularly concerned with and therefore have not undertaken to solve the various problems which arise where security is concerned. In other words, where the information originating at a primary source must be punch-recorded on a card without any possibility of tampering, special requirements are necessary. Exemplary of such situations would be voting machines, charge registers where information on a credit card is recorded on a punch card concurrently with the purchase amount, and pari-mutual and other amusement devices.

It is therefore an object of the invention to provide a card punching machine which possesses a high degree of security and reliability.

It is another object of the invention to provide a card punching machine which can be lodged in a compact, locked housing having only one small opening for receiving the card to be punched.

It is a further object of the invention to provide a card punching machine which is extremely versatile in that it can be used for many different purposes with but a minimum of changes.

It is still a further object of the invention to provide a card punching machine which possesses a number of interlocking features which obviate any possibility of tampering by an unauthorized person.

It is another object of the invention to provide a generally improved card punching machine.

Other objects, together with the foregoing, are attained in the embodiment described in the following description and shown in the accompanying drawings, in which:

FIG. 1 is a top plan view of the machine with the top of the housing removed;

FIG. 2 is a side elevational view thereof, with the side of the housing removed, and portions being broken away;

FIG. 6 is a fragmentary section in plan, the plane of the section being indicated by the line 6—6 in FIG. 2;

FIG. 7 is a plan view of a card blank of a type used in the machine;

FIG. 8 is a fragmentary, median, vertical longitudinal section illustrating details of the basket-rotating and attendant structure;

FIG. 9 is a fragmentary vertical longitudinal section through the single card discriminating member; and FIG. 10 is a circuit diagram of the electrical and attendant elements.

Figure 3:
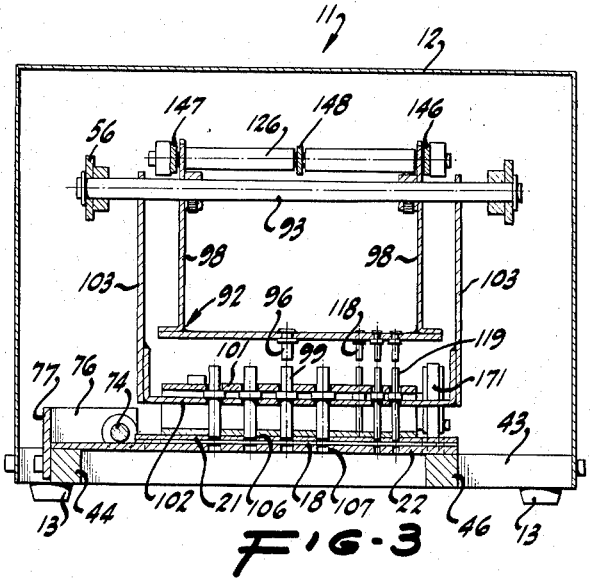
FIG. 3 is a transverse sectional view, the plane of the section being indicated by the line 3—3 in FIG. 2.

While the card punching machine of the invention is susceptible of numerous physical embodiments, depending upon the environment and requirements of use, substantial numbers of the herein shown and described embodiment have been made, tested and used in conjunction with small amusement devices and all have performed in an eminently satisfactory manner.

The card punching machine of the invention, generally designated by the reference numeral 11, comprises a box-like housing 12 mounted on feet 13, the housing having an opening at one end to receive a cable 14 containing an array of conductors 16 leading from a primary information source (not shown) and at the other end a punch card receiving mouth 17 adapted to accept and guide a punch card 18 into a closely encompassing card chamber 19 defined by an upper plate 21 and a lower plate 22 (see FIGS. 6 and 9).

In order to prevent the introduction of more than a single card at a time, a card thickness discriminating member is employed. The discriminating member 26 includes a bracket 27 transverse to the longitudinal axis 28 of the machine. In threaded engagement with a nut 29 welded on the bracket 27 is a vertically adjustable screw 31. As the screw is lowered the screw tip depresses a spring leaf 32 mounted at one end on the upper plate 21 downwardly off-set to lie within an opening 33 in the upper plate 21. The bottom surface of the rigidly positioned spring leaf 32 lightly engages the upper surface of the card 18, permitting a single card to slide underneath it but barring any attempt to introduce more than one card at a time.

The card chamber is mounted on a generally rectangular elongated, fixed frame 41, the fixed frame 41 including a first transverse end member 42, a second transverse opposite end member 43 and a pair of elongated side members 44 and 46 (see FIG. 3).

Upstanding from the ends of the first transverse member 42 is a pair of brackets 51 having pivotally mounted thereon, for angular movement about a pair of pivot pins 52, a pair of legs 53 depending from the adjacent end of a movable frame, generally designated by the numeral 54.

The movable frame 54 is generally rectangular in outline, overlies the subjacent fixed frame and comprises a pair of fore and aft, side or lever members 56 joined at their forward, or left-hand end (see FIGS. 1, 2 and 8) by a transverse bar 57.

Urging the forward end of the movable frame upwardly is a strong compression spring 61 interposed between the cross bar 57 and a laterally projecting bracket 62 mounted on a vertical, fore and aft plate 63 forming a part of the fixed, or bed, frame 41.

Adapted to overcome the upward bias of the spring 61 and to urge the forward end of the movable frame 54 angularly downwardly, about the pins 52 as a pivot, is a main solenoid member 66 including the customary electro-magnetic coil 67 mounted on the fixed frame and a vertical plunger 68 pivotally mounted on the cross bar 57 of the movable frame.

Figure 4:
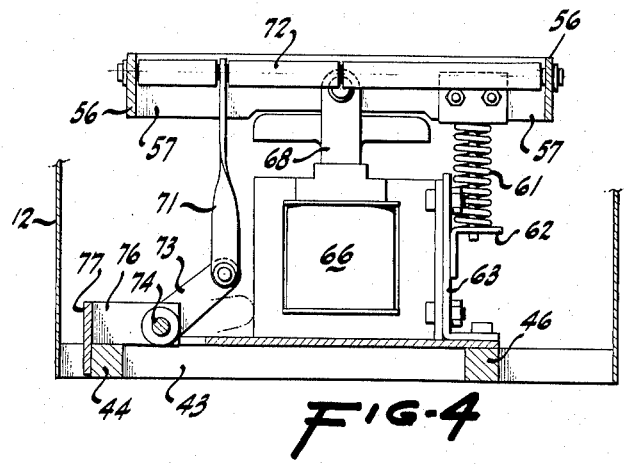
FIG. 4 is a transverse sectional view, the plane of the section being indicated by the line 4—4 in FIG. 2.

Energization of the solenoid, in a manner subsequently to be described, pivotally depresses the movable frame and concurrently urges downwardly a vertical link 71 pivotally mounted at its upper end on a cross rod 72 extending transversely between the fore and aft movable frame members 56. The lower end of the vertical link 71 is pivotally mounted on a crank arm 73 (see FIG. 4) mounted on a fore and aft shaft 74 journalled at its opposite ends in a pair of transverse brackets 76 mounted on the fixed frame, the outer ends of the brackets 76 being connected by a longitudinal bar 77 in the interests of rigidity.

Figure 5:
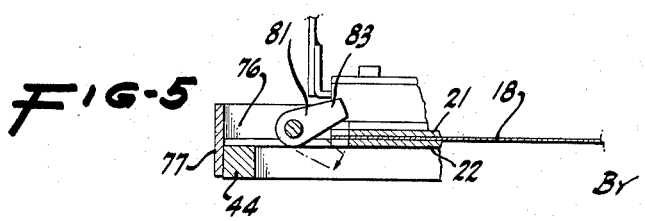
FIG. 5 is a fragmentary sectional view illustrating the machine-identification finger punch structure, the plane of the section being indicated by the line 5—5 in FIG. 2.

Mounted radially on the shaft 74 is a plurality of card punching fingers 81 (especially, see FIGS. 5 and 6) disposed in close juxtaposition to the adjacent side of the card chamber. The adjacent sides of the card chamber walls have formed therein a plurality of rectangular openings 82 formed therein in registry with the fingers 81. Consequently, as the movable frame and the link 71 are depressed and the shaft 74 and fingers 81 are rotated in a clock-wise direction (see FIG. 5) the tips 83 of the fingers 81 sweep downwardly through the chamber openings 82 and shear or punch the adjacent edge of the card 18 disposed within the chamber. The fingers 81 and the openings 82 are located at predetermined positions with respect to the card so that as punching of the card occurs, the accounting station or identity of the machine is recorded on the card. Many types of numerical identification systems could be used. Exemplary is the binary system illustrated in FIG. 7 where the particular punched out portions made by the fingers 81 of the machine and indicated in the row 86 on the card 18 can be read, reading the row 86 from right to left, as machine number 196.

Every machine in a multi-machine system, in other words, has the fingers 81 arranged in a different manner so that the information on any card punched by any machine can be attributed to a specific machine. This identifying number remains fixed for any given machine.

Each machine, on the other hand, is capable of punch-recording various different types and amounts of information on the card. This is made possible owing to the provision of a multiple punch mechanism, generally designated by the reference numeral 91. Said mechanism includes a basket structure 92 mounted on a transverse shaft 93 journaled in the opposite side levers 56 of the movable frame, the basket 92 being therefore vertically movable with the movable frame. The basket is also rockable about the axis of the shaft 93 with movement taking place in selected discrete angular amounts so as to bring into vertical attitude a predetermined one of a row of studs 96 the stud rows being radially disposed on a plurality of sector plates 97 mounted on the periphery of a pair of sector-shaped plates 98 secured to the transverse rotatable shaft 93.

In the basket structure 92 illustrated there are four stations, each station containing a row of radial studs capable of imparting a selected piece of information. As appears most clearly in FIG. 8, the first position is the base position with the studs 96 in the vertical attitude shown. The second position of the basket (not shown) would be with the studs 96a in vertical attitude, i.e., with the basket 92 having been rotated in a clock-wise direction (see FIG. 8) through an angle of approximately twenty-five degrees. In a comparable manner, the third station is with the studs 96b in vertical attitude and in the fourth station the studs 96c are disposed vertically over the subjacent vertical card punch 99.

In the embodiment shown, there is, for simplicity, only one stud 96 for each station. Correspondingly, there is only one vertical punch 99 for each of the four stations (see FIG. 3). Each of the four studs is laterally displaced from the other studs and is adapted to register with only one of the subjacent punches 99. FIG. 3, for example, shows the basket structure in base position with the stud 96 in vertical registry with the punch numbered 99. In the remaining three stations, a predetermined one of the vertical punches 99 is in registry with a predetermined one of the studs 96a, 96b or 96c.

The studs 99 are mounted for vertical translation in appropriate vertical openings in a fixed horizontal plate 101 secured to the fixed frame and in a vertically movable horizontal plate 102, the vertically movable plate 102 being horizontally mounted on the lower ends of a pair of vetrical brackets 103 depending from the transverse shaft 93 and thus being vertically movable with the movable frame.

It is to be noted at this point that the extent of vertical movement of the movable frame is fairly small in amount, being only a fraction of an inch in the embodiment shown. Consequently, the plunger 68 of the solenoid 66 can be considered to move in a linear fashion through the coil 67 even though there is a slight fore and aft shift of the plunger as the movable frame is depressed and raised.

Similarly, the downward movement of the basket studs 96 into engagement with the punches 99 can be considered as substantially vertical in nature. As the movable frame 54 (see FIG. 8) is depressed, the stud 96 comes into engagement with the subjacent punch 99 and urges the bottom end of the punch 99 past an opening 106 in the upper chamber plate 21, through the interposed card 18 and into a registering opening 107 in the lower chamber plate 22. As explained above, the horizontal plate 102 encompassing the punch pin 99 moves downwardly concurrently with the basket stud 96. Consequently, an annular flange 108 mounted coaxially on the pin 99 and interposed between the vertically movable plate 102 and the fixed plate 101 offers no resistance to downward translation of the pin 99. As the movable frame 54 and the attached plate 102 return to upper position, however, under urgency of the spring 61, the movable plate 102 engages the pin flange 108 and urges the pin upwardly to its base position where the shoulders of the flange are stopped by the fixed plate 101.

As appears most clearly in FIG. 7, the result of punching the card in the manner shown and described is to leave an opening 111 in the card 18. This opening corresponds to a preselected bit of information transmitted to the machine in a manner subsequently to be described. The remaining three circles 111a, 111b and 111c, correspond to the three additional stations and, when punched, record still more information. The circles 111 are fairly large and serve conveniently as readily visible indicia of certain information which ordinarily would be printed alongside each circle.

For example, in registering a credit transaction at an automobile service station, the four circles might be used to show any single one of four entries of gasoline, lubricating oil, tires or other service and accessories. The circles would readily indicate to the attendant which of these items had been recorded on the card and whether it was correctly indicated.

Concurrently, with the readily observable punching out of one of the circles 111 there is also provided a punching out of one or more small openings 116 in the card 18 (see FIG. 7) resulting from the punching action of a plurality of small studs 118 (see FIGS. 3 and 6) mounted, like the larger studs 96, on each of the sector portions 97, in a predetermined pattern. The small punched openings 116 are caused by downward movement of a corresponding grouping of small pins 119 disposed above the card in the card chamber. The small studs 118 and the small pins 119 are constructed and cooperate in a manner substantially identical to that described for the larger studs and pins and it is therefore believed that further detailed description is not necessary. The pattern of the small openings 116 punched in the card is different for each of the four stations but corresponds with the information more readily indicated by the larger opening 111. The small openings 116, in other words, duplicate, to an extent, the information conveyed by the large openings 111. However, the small openings 116 lend themselves more readily to data processing and are therefore included.

A description will now be made of the structure which rotates the basket 92 into a preselected one of three discrete angular positions in addition to the base position illustrated.

In base position, the lower portion of the basket is urged to its maximum counter-clockwise location, as shown in FIGS. 1, 2 and 8, further movement being limited by a stop plate 123 projecting into interfering relation with the adjacent basket edge. The basket is urged to move in the counterclockwise direction by a plurality of tension springs 124 (see FIG. 1) mounted at their lower ends on the transverse rod 72 and at their upper ends on a transverse axle 126 journaled on and extending between the sector shaped side plates 98 of the basket 92.

Adapted to overcome the counter-clockwise biasing effect of the springs 124, and to swing the basket into a predetermined one of the three angular positions removed from the base position, is a plurality of solenoids 131, 132 and 133 (see FIG. 1), each including the usual coil and plunger.

The three solenoids are substantially identical in construction except for the extent which each of the plungers project initially from the corresponding coil. In the solenoid 131, the plunger 141 initially projects but a short distance whereas in the solenoid 132 the plunger 142 is initially extended approximately twice as far as the plunger 141. Lastly, the central plunger 143 projects still farther outwardly from its coil.

Since the projected end of each of the plungers 141, 142 and 143 is connected by a corresponding link 146, 147 and 148 (see FIG. 1) to the transverse axle 126, with the ends of each of the links being pivotally mounted on the respective plunger and on the axle, it can be seen that as any one of the solenoids is actuated, the basket will be rotated in a clockwise direction (see FIG. 8). Furthermore, the extent of angular rotation of the basket will vary in dependence upon the amount of movement or stroke of the particular plunger being actuated. Thus, if the solenoid 131 is energized, the basket will be swung into second position wherein the studs 96a are in registry with the vertical pins 99, and actuation of the solenoid 132 will swing the basket into third position with the studs 96b in vertical attitude. Lastly, as the plunger 143, initially projecting the greatest amount, is drawn into the coil as the solenoid 133 is actuated, the basket is swung to fourth position, with the studs 96c overlying the pins 99.

It will be realized that only one of the three solenoids 131, 132 and 133 would be actuated at any one time since the signal from the primary source would either not actuate any of the solenoids 131, 132 and 133, thus leaving the basket in base, or first, position, or the signal would energize solenoid 131 or 132 or 133.

In the event the short stroke solenoid 131 were energized, the intermediate stroke plunger 142 and the long stroke plunger 143 would tend to be urged toward their respective unenergized coils by their respective links except for the provision of a lost motion achieved by providing a longitudinal slot, for example, the slot 145 (see FIG. 8) in the link 146 in which the transverse axle 126 can move without translating the links 147 and 148. Similarly, where, for example, the longest stroke solenoid 133 is actuated and the plunger 143 is retracted, the short stroke plunger 141 and the intermediate stroke plunger 142 are not moved owing to the lost motion achieved by the longitudinal slots in each of the appropriate links. The slot in the link of the most projected plunger 143 is the shortest in length; the slot on the least projected plunger 141 is the longest in length; and the slot in the intermediate plunger link is intermediate in length.

As will shortly be explained in detail, with reference to the circuit diagram, rotation of the basket to its appropriate station occurs substantially instantaneously as the signal is received from the primary source, and it is not until after the basket has been properly positioned that the movable frame is depressed by energizing the main solenoid 66. Consequently, at the time the movable frame and the basket are depressed, the proper studs are in alignment with the punch pins 99.

As previously stated, the primary source of electrical signals sent to the card punching machine of the invention is susceptible of numerous variations. While no detailed mechanical disclosure is here made, a circuit diagram of a typical signal source is diagrammatically illustrated in FIG. 10 in an outline box and is designated generally by the reference numeral 151. The device 151 is electrically connected to the punch card machine by a suitable plug and socket coupling 152.

Electrical energy is provided by a power plug 153 from which extends a load or power line 154, and to which extends a "ground" or return line 155. The line 154 connects at 156 to a conductor 157, or bus, extending to a plurality of switches, as will be described.

Operation of the primary signal source establishes, on each cycle of operation, a predetermined set of switch conditions. One set would, for example, be with the source switch 161 to close; another set, the source switch 162; another set, the source switch 163; and another, the source switch 164. In all of these cases, only one of the source switches will be closed during any one cycle. The foregoing conditions are brought about within the primary signal source in a manner which forms no significant part of the present invention and which is therefore not described in detail.

Assuming, however, that the internal operation of the primary source 151 causes the switch signal 161 to close, it can be seen that current from the bus 157 passes from the junction 166, along the conductor 167, through the switch 161 and back along the conductor 168 to the terminal of the card-actuated switch 171 (see FIGS. 1, 3 and 6). The card switch 171 is preferably of the microswitch type, normally open, and is located at the inner end of the card chamber so that insertion of the card fully into the card chamber physically trips the switch 171 and closes the circuit.

As the card switch 171 is closed, current passes through the contact 172 and along the conductor 173, through a normally closed relay switch 176 and returns along a return line 177 to a return bus 178 joined at 179 to the ground lead 155. The current, in passing along the return line 177 energizes the coils of the main punch solenoid 66, thus causing the movable frame of the punch card machine to depress into card punching position.

It is pointed out at this juncture that the basket structure is not moved in the operation just described. Instead, the basket remains in its base or first position. Thus, as the movable frame is depressed, the studs 96 and 118 depending from the basket press down on the respective subjacent punches 99 and pins 119 and punch the card accordingly. At the same time the fingers 81 cut the side of the card for purposes of identifying the accounting station.

In order to retract the punching elements from the card, so as to allow withdrawal of the card from the machine, the main solenoid 66 must be deactivated.

While numerous arrangements to accomplish this result could be used, depending upon the environment and purpose of the card punching machine, a normally open switch 191 (see FIG. 10) having one side energized by the bus 157 through a junction 193 and a line 194 is manually closed at the signal source.

As the switch 191 is closed, current flows through a conductor 196 through a junction 198, and along a line 199 to the junction 20.

From the junction 200, a portion of the current flows through a solenoid 201, thence through a junction 202 to return to ground 155. Energizing the solenoid 201 causes a superposed gang of relay switches to depress simultaneously in a manner well known in the art. Included among the ganged switches so depressed is the normally closed switch 176.

As the switch 176 opens, the main solenoid 66 is deenergized, allowing the movable frame to swing upwardly to its base position and thus freeing the card to allow its withdrawal. As the card is withdrawn, the card switch 171 returns to its normally open position.

Whereas the foregoing description refers to the sequence which takes place upon closure of the switch 161 located within the signal source 151, attention is now directed to the occurrences attending the closure of, for example, the switch 164.

It will be understood, by reference to the drawings, and particularly to FIG. 10, that the switches 162, 163, and 164 and their attendant circuit elements, act in a substantially identical manner, the major difference being in the amount of angular movement imparted to the swinging basket by their respective actuation. Consequently, a description of the elements and events related to the closure of the switch 164 will serve equally to describe the closing of switches 162 and 163 with the differences therebetween being noted, where appropriate.

As the switch 164 is closed, current flows through the line 211, through the plug 152, along the conductor 212 and through the coils of the solenoid 132 (see FIGS. 1 and 10), the solenoid 132 being the one with the intermediate length of stroke. From the solenoid 132, the current returns through the line 216, the junction 217 and the line 178 to ground 155.

In the usual case, the conditions of the switches 161–164 will have been set prior to the insertion of the card. Consequently, as the switch 164 is closed and the solenoid 132 is thereby actuated so as to swing the basket into intermediate angular position, with the punch 96b in vertical attitude, subsequent insertion of the card 18 and tripping of the card switch 171 effects an instantaneous depression of the movable frame and consequent punching of the card.

As has been explained, the card will not only be punched in locations such as to carry information corresponding to that assigned to the switch 164 but the fingers 81 will have cut the edge of the card in such a way as to identify this particular machine as the source of the information.

After the punching of the card has taken place, the solenoid 132 is de-energized as by closing the switch 191 in the manner heretofore described.

In order to assure the proper sequence of events, as well as to complete the main solenoid circuit, a mechanical connection 231 between the solenoids 131, 132 and 133 and a sequence switch 232 is provided. The live side of the switch 232 is connected to the bus 157. Thus, when the switch 164 (or the switch 162 or the switch 163) is closed and the solenoid 132 (or the solenoid 131 or the solenoid 133, respectively) is energized, the sequence switch 232 is mechanically closed. The mechanical linkage is obtained by extending from solenoid plungers 141, 143 and 142, corresponding rods 241, 243, and 242, respectively (see FIG. 1). These rods project through openings in a transverse plate 246, pivoted at its bottom outer ends on pins 247 (see FIGS. 1 and 2) so as to tilt against a roller 251 on the actuating arm 252 of the sequence switch 232.

Tilting of the plate 246 and consequent actuation of the switch 232 is effected as any one of the longitudinal rods 241–243 is urged toward the right (see FIGS. 1 and 2) by movement of the corresponding solenoid plunger.

It is to be noted that each of the rods projects to the left beyond the plate 246 (see FIG. 1) by a different amount and at the left-hand end, each of the rods is bent transversely to provide a tip which interferes with the plate when pulled against the plate, and thus tilts the plate against the sequence switch arm so as to actuate the sequence switch 232.

As appears most clearly in FIG. 1, the rod 241 terminates in a tip 261; the rod 243 in a tip 263; and the rod 242, in a tip 262. The tip 261 is spaced closest to the transverse tilting plate 246 since the plunger 141 of the solenoid 131 moves the shortest distance (corresponding to and causing the least angular movement of the basket). Similarly, the tip 263 is spaced farthest away from the plate 246 since the plunger 143 has the greatest stroke. The tip 262, it follows, is spaced an intermediate distance since the plunger 142 moves an intermediate distance.

It will be noted that a lost motion exists with respect to the rods. In other words, as any one of the rods is pulled by its plunger toward the right (see FIG. 1) the other two rods remain in place, the plate merely sliding along the rods as the plate moves toward the right.

As the sequence switch 232 closes, current flows along the line 271 (see FIG. 10), through the junction 184 and to one side of the card switch 171. Then, as the card switch 171 is closed by insertion of the card into the chamber, current flows as heretofore described, along the conductor 173, through the switch 176 and the main solenoid 66 (thus depressing the movable frame) and back to ground.

To clear the device, the switch 191 is closed, de-energizing the main solenoid 66 and allowing the movable frame to return to base position. Concurrently, by mechanism (not shown) in the signal source, the switch 164 is opened, thus de-energizing the basket-actuating solenoid 132 and allowing the normally open sequence switch 232 to be returned to its open position.

It is to be recognized that the above-described embodiment is capable of numerous varieties and kinds of adaptations, and that the array of information transferred to a punch card is capable of being greatly augmented by increasing the number of stations on the basket member and by a corresponding increase in the number of information centers within the signal source.

What is claimed is:

1. A card punch machine comprising:
 (a) a generally elongated fixed frame;
 (b) an elongated movable frame overlying said fixed frame and being pivotally mounted thereon adjacent one end to pivot in a vertical direction;
 (c) electrically energizable means for downwardly urging said movable frame;
 (d) an elongated card receiving chamber defined by walls mounted on said fixed frame and underlying said movable frame, said chamber having located adjacent one end a card receiving opening and adjacent the other end a card actuated switch, said switch being connected to said electrically energizable means;
 (e) means located adjacent said chamber and operatively connected to said movable frame for punching a card inserted through said opening and across said chamber into actuating relation with said card actuated switch, said card punching means including a shaft journaled on said fixed frame adjacent said chamber, said shaft having a plurality of radial fingers mounted thereon at predetermined locations for movement through registering openings in said chamber walls into card punching position as said shaft is rotated, and crank means connecting said movable frame and said shaft for rotating said shaft in dependence upon the movement of said movable frame.

2. The device of claim 1 further characterized by a rockable basket member journaled on said movable frame, said basket member having mounted thereon a plurality of rows of downwardly projecting radial studs in predetermined locations, a plurality of vertically translatable punches aligned with openings in said chamber walls, and a plurality of electrically actuated means for rotating said basket member to a predetermined angular position for alignment of a predetermined row of said studs with said punches whereby said punches are urged downwardly into card punching relationship with said card as said movable frame is depressed.

3. The device of claim 2 further characterized by an electrical energy source, and a plurality of switch means for selectively actuating said basket rotating means.

4. A card punching machine comprising:
 (a) an elongated, horizontal, fixed frame;
 (b) an elongated movable frame overlying said fixed frame and being pivotally mounted at one end on said fixed frame, the other end being movable in a substantially vertical direction between a first, substantially horizontal position and a second, angularly depressed position;

(c) a card switch on said fixed frame, said switch being actuable by contact with a card urged against said switch;

(d) a rockable basket member pivotally mounted on said movable frame for rotation about a transverse, horizontal axis, said basket member including a plurality of rows of radial studs disposed on said basket member at predetermined angles;

(e) a plurality of solenoid means connected to said basket member for positioning said basket member at a selected one of said predetermined angles whereby a desired one of said rows of studs is in a vertical attitude;

(f) a plurality of electrical signal sources connected to said solenoid means, said signal sources being capable of actuating said solenoid means; and, (g) electrical means connected to said switch for urging said movable frame, said basket member and said one of said rows of studs from said first position to said second position as said switch is actuated by a card urged against said switch.

5. The device of claim 4 further characterized by a card receiving station located adjacent said card switch; and card punch means operatively connected to said movable frame and located adjacent said card receiving station for punching a card disposed in said station as said movable frame is moved from said first position into said second position.

6. A card punching machine comprising:
(a) a first frame;
(b) a second frame connected to said first frame for relative movement therebetween;
(c) a card receiving station on said first frame, said card receiving station including an electrical switch actuated by a card inserted in said station and urged against said switch;
(d) means connected to said switch for moving said second frame toward said first frame as said switch is closed;
(e) a plurality of primary signal sources;
(f) a plurality of solenoids connected and individually actuated by a corresponding one of said primary signal sources;
(g) a card punching mechanism on said second frame and operatively connected to said solenoids for selective movement thereby in response to a signal from a predetermined one of said primary signal sources.

References Cited by the Examiner
UNITED STATES PATENTS

| | | | |
|---|---|---|---|
| 2,248,136 | 8/1941 | Swanson | 234—42 |
| 2,607,421 | 8/1952 | Anderson | 83—372 X |
| 2,970,752 | 2/1961 | Wittenmyer | 234—99 |
| 3,044,337 | 7/1962 | Schroder et al. | 83—372 |

WILLIAM W. DYER, JR., *Primary Examiner.*

WILLIAM S. LAWSON, *Examiner.*